(12) United States Patent
Mickolls et al.

(10) Patent No.: X7128
(45) Date of Patent: Jun. 22, 1832

(54) WATER WHEEL, HORIZONTAL

(76) Inventors: John Mickolls; Solomon P. Wheeler

John Nicholls & Solomon P. Wheeler. Bolivar Tenn.

Letters Patent

The Schedule referred to in these Letters Patent and making part of
the same containing a description in the words of the said John Nicholls
and Solomon P. Wheeler, themselves of their improvement in the
horizontal current Water Wheel and inclined Race Wheel Be it known that we John Nicholls and Solomon P. Wheeler
both of Bolivar Hardeman County State of Tennessee have made improve-
ments in the Horizontal current Water Wheel and inclined race Wheel
which are described as follows The first wheel which we shall describe
consists of the spiral screw shaft. the arms and swinging floats or buck-
ets. the guard ring & stops the windlass for raising and lowering the guard
ring. the horizontal cog wheel. the fore bay and trough and sliding
gauge — the second Wheel which we shall describe consists
of the shaft the arms and swinging buckets & the inclined race or
spout for conducting the water. The first or current water wheel
The spiral screw Shaft. This is made of metal or wood of any con-
venient size. A screw right or left of any pitch is cut upon it from
within a small distance of the bottom to any required height &
it turns in [illegible] on gudgeons like other shafts for water wheels
The arms with the swinging floats or Buckets. Eight arms more
or less are bolted ~~down~~ fast to a metallic ring or hub having a female screw
in it to work in the screw on the shaft and notches or steps made on
the upper side to receive the projections or stops of the guard ring to
be hereafter described. Upon the extremities of the arms are suspen-
ded the swinging floats by means of hinges. the floats are made
fan shaped being narrowest near the shaft. A circular frame of wood
or metal embraces all the arms on the upper side all around and forms
a brace to the arms. upon this circular frame and near each arm
is placed a [illegible] having a shank with a circular head [illegible]

thro' the frame for supporting the swinging Buckets whilst the frame
of arms and baskets are lowered on the screw shaft. The guard ring
+ Stops. A metallic ring embracing the shaft having projections
or teeth on the lower side is suspended by ropes or chains from a
windlass placed on the horizontal cog wheel to be hereafter described
This guard ring is for keeping the frame of arms and buckets at any
required height on the shaft by means of the teeth on the ring catching
in the notches of the hub which supports the arms. It also catches in
grooves cut in the shaft to prevent it turning. A Horizontal cog
wheel. which communicates motion to the mill is placed near the
top of the shaft. Upon this wheel is put a windlass or capstan
having two ropes or chains on it passing over pulleys placed near
the shaft and attached to the guard ring by which it is raised
or lowered on the shaft = The sliding gauge. In the frame of
the forebay is fixed the sliding gauge. This gauge consists of an upright
shaft or stock with a spring behind it and working in a dovetail
groove. An arm projects from the upright stock or shaft at right
angles and passes over the cranks which keep the swinging buckets
horizontal. when it is required to let down the buckets the gauge
is set down to touch the top of the crank handles which turn the
circular heads and let down the buckets = The fore bay and trough
In front of this horizontal water wheel is a swinging gate or water
[illegible] turning on two pivots fixed in the front of the fore bay
It is kept at any required angle by means of a strap or bar of
iron having a slot or opening in it attached at one end to the
gate and the other extending to the wall or frame of the forebay
where a screw passing through the slot fixes the gate at any angle
and lets the water into the wheel in any required angle. the wheel
turns in a circular trough of a size adapted to the size of the wheel
and the water is made to pass off in a proper shute.
Operation – When it is required to lower the frame of floats or buck-
ets the swinging floats are turned up and kept in a horizontal posi-
tion by the cranks on the circular frame. the frame of arms and floats.

is then turned by hand on the screw shaft and lowered to any requi-
red hight the guard ring is then let down by the windlass and
the teeth in the ring catch into the notches of the ring or hub of the
frame of arms and buckets. the swinging buckets are then let down
by the gauge and the horizontal wheel set in motion the flood-
gate being first placed at a proper angle for letting on the water.
The invention here claimed in the before described horizontal Water Wheel is the
spiral screw shaft: the guard ring or stops. and the mode of raising and lowering
it and the mode in which the floats are supported by the cranks and the
gauge to let them down — <u>The second or inclined race wheel</u>. The shaft
and arms of this wheel are the same as other horizontal water wheels. the num-
ber of arms will be proportioned to the size of the wheel calculated for — or
— feet apart at their extremities — <u>The swinging Buckets or Floats</u>,
are attached by hinges to the ends of the arms. the buckets when down
will be supported by the hinges against the front of the arms. also the
upper edge of the bucket will rest against the under side of the arm.
The <u>inclined race</u> or spout is formed of wood or other materials. It must
be elevated to an angle of 6 or 8 degrees more or less. to be contracted at bot-
tom to nearly the width of the bucket. The top of the race of course to be
wider. the water from the race is conducted in a circular segment trough
of about 3 feet in length and its curve is adapted to the size of the wheel.
An inclined plane is placed near the top of the circular trough on which
inclined plane the swinging buckets are raised and turned into the circular trough.
Operation. The water descending down the inclined race acquires the ne-
cessary velocity and strikes the swinging buckets at nearly right angles. thus
producing the greatest effect The invention here claimed is the be-
fore described inclined race or spout and circular segment trough and
the construction of the swinging buckets to act at nearly right angles
with the water. also the inclined Plane for raising and turning the
swinging buckets into the circular trough For a further illustration of our invention we refer
to the models and drawings of the same deposited in the Patent
Office. In witness whereof we have hereunto subscribed thro' the frame for supporting the swinging Buckets whilst the frame
of arms and buckets are lowered on the inner shaft. The guard ring
& Stops. A metallic ring embracing the shaft having projections
or teeth on the lower side is suspended by ropes or chains from a
windlass placed on the horizontal cog wheel to be hereafter described
this guard ring is for keeping the frame of arms and buckets at any
required height on the shaft by means of the teeth on the ring catching
in the notches of the hub which supports the arms. It also catches in
grooves cut in the shaft to prevent it turning. A Horizontal cog
wheel. which communicates motion to the mill is placed near the
top of the shaft. Upon this wheel is put a windlass or capstan
having two ropes or chains on it passing over pulleys placed near
the shaft and attached to the guard ring by which it is raised
or lowered on the shaft. The sliding gauge. In the frame of
the fore bay is fixed the sliding gauge. This gauge consists of an upright
shaft or stock with a spring behind it and working in a dovetailed
groove. An arm projects from the upright stock or shaft at right
angles and passes over the cranks which keep the swinging buckets
horizontal. when it is required to let down the buckets the gauge
is set down to touch the top of the crank handles which turn the
circular heads and let down the buckets. The fore bay and trough
In front of this horizontal water wheel is a swinging gate or water
director turning on two pivots fixed in the front of the fore bay
It is kept at any required angle by means of a strap or bar of
iron having a slot or opening in it attached at one end to the
gate and the other extending to the wall or frame of the fore bay
where a screw passing through the slot fixes the gate at any angle
and lets the water onto the wheel in any required angle. the wheel
turns in a circular trough of a size adapted to the size of the wheel
and the water is made to pass off in a proper shute.
Operation — When it is required to lower the frame of floats or buck-
ets. the swinging floats are turned [illegible] horizontal [illegible]
[illegible] cranks on the circular frame. the frame of arms and floats.

is then turned by hand on the screw shaft and lowered to any requi
red height. the guard ring is then let down by the windlass and
the teeth in the ring catch into the notches of the ring or hub of the
frame of arms and buckets. the swinging buckets are then let down
by the gauge and the horizontal wheel set in motion the flood
gate being first placed at a proper angle for letting on the water.
The invention here claimed in the before described horizontal Water Wheel is the
spiral screw shaft. the guard ring or stop. and the mode of raising and lowering
it and the mode in which the floats are supported by the cranks and the
gauge to let them down — The second or inclined race wheel. The shaft
and arms of this wheel are the same as other horizontal water wheels. the num
ber of arms will be proportional to the size of the wheel calculated [illegible] — or
— feet apart at their extremities — The swinging Buckets or Floats
are attached by hinges to the ends of the arms. the buckets when down
will be supported by these hinges against the front of the arms. also the
upper edge of the bucket will rest against the under side of the arm.
The inclined race or spout is formed of wood or other materials. It must
be elevated to an angle of 6 or 8 degrees more or less. to be contracted at bot
tom to nearly the width of the bucket. The top of the race of course to be
wider the water from the race is conducted in a circular segment trough
of about 3 feet in length and the curve is adapted to the size of the wheel.
An inclined plane is placed near the top of the circular trough on which
inclined plane the swinging buckets are raised and turned into the circular trough.
Operation. The water descending down the inclined race acquires the ne
cessary velocity and strikes the swinging buckets at nearly right angles. thus
~~producing the greatest effect~~ The invention here claimed is the be
fore described inclined race or spout and circular segment trough and
the combination of the swinging buckets to act at nearly right angles
with the water. also the inclined plane for raising and turning the
swinging buckets into the circular trough For a further illustration of our invention we refer
to the models and drawings of the same deposited in the Patent
Office. In witness whereof we have hereunto subscribed sue making before two witnesses
Wm Pettit } witnesses to the signing } John A Nicholls
Wm G Crouch } of John A Nicholls } S. P. Wheeler
Joseph P. Atwood } witnesses to the sign-
Jesse Ardell } ing of S. P. Wheeler 1274 n8

Ex.
C.H.W.